United States Patent [19]

De Moss et al.

[11] Patent Number: 5,505,428
[45] Date of Patent: Apr. 9, 1996

[54] NON-METALLIC IDENTICAL HALF COUPLING

[75] Inventors: Ronald D. De Moss, Perrysburg, Ohio; Robert A. Laipply, Spring Arbor, Mich.

[73] Assignee: Aeroquip Corporation, Maumee, Ohio

[21] Appl. No.: 260,778

[22] Filed: Jun. 16, 1994

[51] Int. Cl.$^6$ ................................................ F16L 37/06
[52] U.S. Cl. .................... 251/149.9; 137/614.06; 251/368
[58] Field of Search .............. 137/614, 614.06, 137/637.05; 251/315.01, 315.02, 315.03, 315.05, 149.9, 149.5, 366, 368

[56] References Cited

U.S. PATENT DOCUMENTS

| | | | |
|---|---|---|---|
| 4,438,779 | 3/1984 | Allread | 137/614.06 |
| 4,523,740 | 6/1985 | Paitchell | 251/315.05 |
| 5,067,691 | 11/1991 | Hunziker et al. | 251/315.05 |
| 5,090,447 | 2/1992 | Lewis et al. | 251/315.01 X |
| 5,090,449 | 2/1992 | Fournier . | |
| 5,099,883 | 3/1992 | Maiville . | |
| 5,251,940 | 10/1993 | DeMoss et al. . | |
| 5,332,001 | 7/1994 | Brown | 137/614.06 |

FOREIGN PATENT DOCUMENTS 2062809  5/1981  United Kingdom .............. 251/315.05

*Primary Examiner*—Kevin Lee
*Attorney, Agent, or Firm*—Emch, Schaffer, Schaub & Porcello Co.

[57] ABSTRACT

An improved non-metallic half coupling having a housing enclosing a valve that can be rotated between open and closed positions. The coupling includes an annular housing comprised of a polymer material having a first end and a second end. The first end is adapted to receive a second identical half coupling. The second end is adapted to receive a fluid conduit. A fluid passageway is defined through the housing. A valve having a spherical configuration is positioned adjacent to the first end in the housing. The valve is comprised of a polymer material. The valve defines a bore having an axis extending therethrough. A handle comprised of a polymer material is in communication with the valve. The handle rotates the valve about a valve axis transverse to the bore axis between an open position and a closed position. The handle can include various projections and recesses to maintain the proper position of the handle.

16 Claims, 4 Drawing Sheets

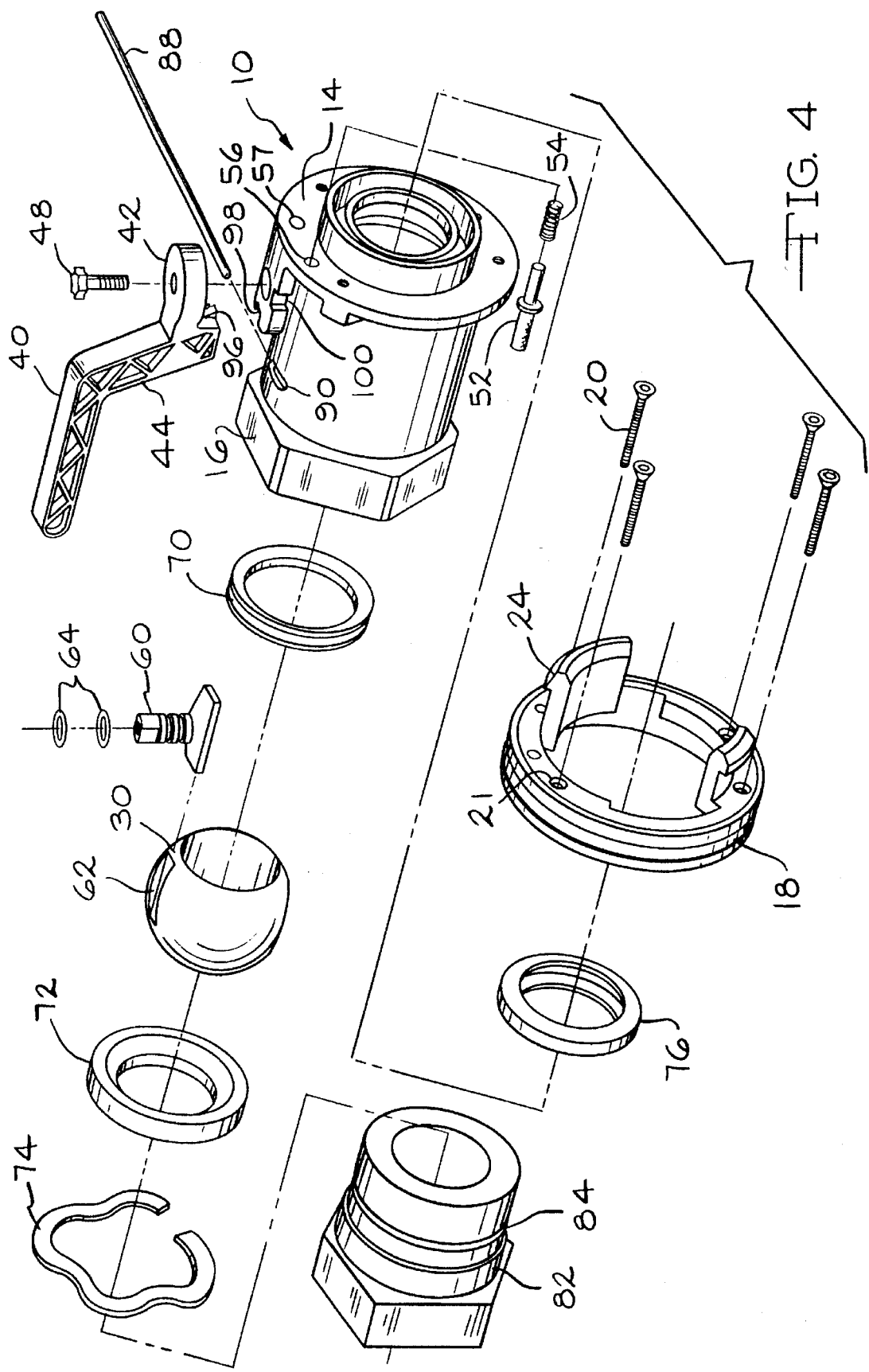

NON-METALLIC IDENTICAL HALF COUPLING

BACKGROUND OF THE INVENTION

The present invention is directed to an improved identical half coupling. More specifically, it is directed to a non-metallic identical half coupling having, among other things, a housing, a valve and a handle each comprised of a polymer material, such as plastic.

Identical half couplings, which are sometimes referred to as a "unisex couplings", are couplings that have identical coupling members that allow for the connection of one coupling to another. These types of coupling are usually completely interchangeable and interconnectable with one another. An example of such a connector is shown in assignee's U.S. Pat. No. 5,099,883.

In the past, these couplings have been constructed using metallic materials. While metal can provide the necessary structural support, it can be inappropriate for use in a number of situations where plastic would be more appropriate. For example, metal is more expensive than plastic. This adds to unit cost. Metal is heavier than plastic. This can cause problems in storage, transport and installation. Some fluids may be corrosive to metal that are not corrosive to plastic. Finally, metal conducts electricity while plastic does not. All of these factors can limit the use of metallic identical half couplings.

The present invention overcomes the problems associated with metal couplings by providing an improved identical half coupling consisting of polymer materials. The invention is also directed to new and useful features for identical half couplings.

SUMMARY OF THE INVENTION

The present invention is directed to an improved non-metallic half coupling having a housing enclosing a valve that can be rotated between open and closed positions. The coupling includes an annular housing comprised of a polymer material having a first end and a second end. The first end is adapted to receive a second identical half coupling. The second end is adapted to receive a fluid conduit. A fluid passageway is defined through the housing.

A valve having a spherical configuration is positioned adjacent to the first end in the housing. The valve is comprised of a polymer material. The valve defines a bore having an axis extending therethrough.

A handle comprised of a polymer material is in communication with the valve. The handle rotates the valve about a valve axis transverse to the bore axis between an open position and a closed position. The handle can include various projections and recesses to maintain the proper position of the handle.

The primary object of the present invention is to provide a non-metallic half coupling.

An important object of the present invention is to provide a non-metallic half coupling that efficiently conducts fluids.

Other objects and advantages of the present invention will become apparent upon a review of the drawings and the following description of the invention.

BRIEF DESCRIPTION OF THE DRAWINGS

FIG. 4 is an exploded perspective view of a second embodiment of the present invention;

DETAILED DESCRIPTION OF THE PREFERRED EMBODIMENTS

Figures 1, 2:
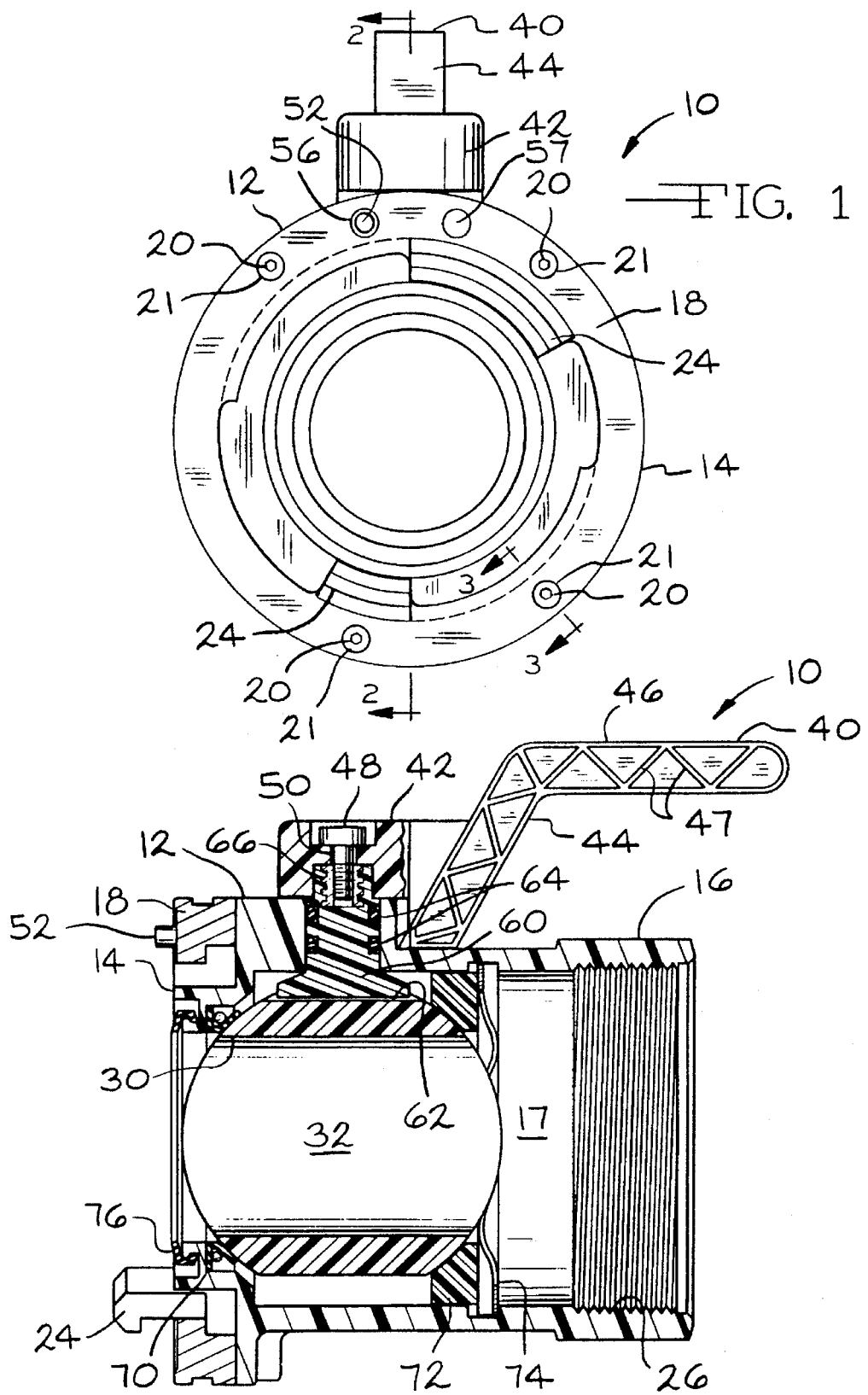
FIG. 1 is a front elevational view of a first embodiment of the improved non-metallic half coupling of the present invention showing the first end of the coupling.
FIG. 2 is a cross-sectional view of the first embodiment of the present invention taken along line 2—2 of FIG. 1.
Figure 3:
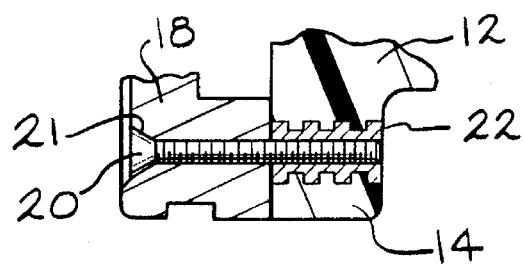
FIG. 3 is a cross-sectional view of the first embodiment of the present invention taken along line 3—3 of FIG. 1.

The present invention will now be described in detail with reference being made to the drawings. The first embodiment of the improved non-metallic identical half coupling is shown in FIGS. 1–3. Referring to FIGS. 1 and 2, the coupling is indicated generally by the reference number 10. The coupling 10 includes an annular housing 12 having a first end 14 and a second end 16. A fluid passageway 17 having a longitudinal axis is defined by the housing 12. The housing 12 is comprised of a polymer material. The term "polymer" as used herein means synthetic organic polymers. These polymers can include thermoplastics, thermosets and elastomers. In the present embodiments, the polymer material used in the construction of the housing 12 is selected from a group including acrylonitrile-butadiene-styrene, phenolic, polycarbonate, polyethylene, polypropylene, and polystyrene. However, other polymer materials can be used depending on the application. The choice of a particular type of polymer material for use in the housing is dependent on a variety of factors. Some of these factors include pressure, temperature, and the characteristics of the fluids passing through the coupling.

As shown in FIGS. 1 and 2, the first end 14 is adapted to receive a second identical half coupling (not shown). The second identical half coupling has all of the features of the coupling 10. The first end 14 receives an annular face plate 18. The face plate 18 can be fastened to the first end 14 by one or more screws 20 that extend through openings 21. As shown in FIG. 3, threaded metal inserts 22 can be placed in the housing 12 to provide a secure attachment for the screws 20.

The face plate 18 includes arcuate connector fingers 24 axially extending from the face plate 18. The fingers 24 mate with similar fingers extending from the face plate of the second identical half coupling to join the couplings together. This connection is disclosed in assignee's U.S. Pat. No. 4,438,779, which is incorporated herein by reference. The face plate 18 can be coded by color or otherwise to prevent the improper connection of the couplings. Further, the fingers 24 can be arranged in certain ways by number, size, location, or configuration to ensure proper connection. This provides security against the improper mixing of fluids passing between the couplings.

The face plate 18 can be made of polymer materials or metallic materials. The polymer materials are selected from a group including acrylonitrile-butadiene-styrene, phenolic, polycarbonate, polyethylene, polypropylene, and polystyrene. Aluminum is an example of a metallic material that can be used for applications that require additional strength.

As shown in FIG. 2, the second end 16 of the housing 12 can be adapted to receive a fluid conduit (not shown). In the present embodiment, the second end 16 includes an integral threaded portion 26. The threaded portion 26 receives a mating threaded portion of the fluid conduit.

Referring to FIG. 2, a valve 30 is positioned adjacent to the first end 14 within the housing 12. In the present embodiment, the valve 30 has a spherical configuration. The valve 30 defines a bore 32 having an axis. The valve 30 can be comprised of polymer materials selected from a group including acrylonitrile-butadiene-styrene, phenolic, polycarbonate, polyethylene, polypropylene, and polystyrene.

As shown in FIGS. 1 and 2, the first embodiment of the invention includes a handle 40. The handle 40 includes an integral housing connection plate 42, a shank 44 and a hand piece 46. The handle can be reinforced with ribs 47. The handle 40 is connected to the housing 12 by a screw 48 that is received through an opening 50 in the connection plate 42. The screw 48 extends through the connection plate 42 into an actuator 60. The actuator 60 is engaged with a recess 62 in the valve 30. When the handle is moved from a first position to a second position, the valve 30 is rotated about a valve axis transverse to the bore axis between an open position wherein the bore 32 is in communication with the first end 14 and the fluid passageway 17 of the housing and a closed position wherein the valve 30 closes the first end 14 from the fluid passageway 17. The open position is shown in FIG. 2.

The handle 40 can be constructed of a polymer material selected from a group including acrylonitrile-butadiene-styrene, phenolic, polycarbonate, polyethylene, polypropylene, and polystyrene. The actuator 60 can consist of a polymer material selected from a group including acrylonitrile-butadiene-styrene, phenolic, polycarbonate, polyethylene, polypropylene, and polystyrene.

The actuator 60 can include one or more O-ring seals 64 to prevent the leakage of fluid from the fluid passageway 17 to the exterior of the housing 12. In the present embodiment, there are two seals 64 for redundant sealing. The actuator can also include a metal insert 66 to provide a secure attachment for screw 48.

As shown in FIG. 2, the coupling 10 includes bearings and gaskets positioned within the housing 12 adjacent to the valve 30. In the present embodiment, the coupling includes an energized spring seal 70 adjacent to the first end 14, and a bearing 72 and a wave spring 74 at the second end 16. A face plate seal 76 is positioned adjacent the face plate 18. The seals can be comprised of elastomeric materials such as nylon, nitrite, chlorobutyl, hydrogenerated nitrile, neoprene and synthetic resin polymers and products, such as TEFLON®. The wave spring 74 can be constructed of metal. Other suitable materials for the bearings include various metals, ceramics and other thermoplastics.

Figure 7:
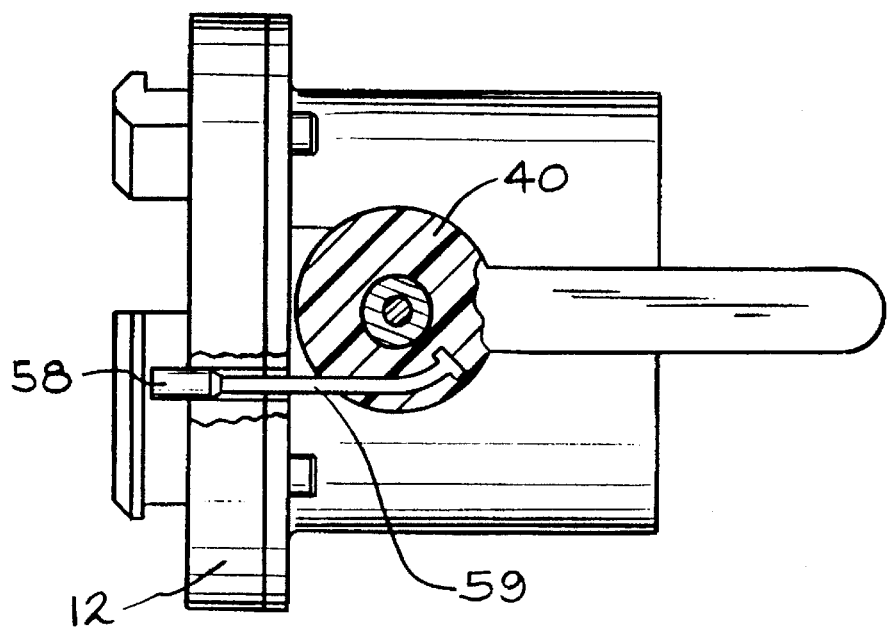

Referring to FIGS. 1, 2, 4 and 7, the safety interlock feature of the present invention is shown. As shown in FIG. 4, the feature includes a safety interlock pin 52 and a pin spring 54 positioned in a pin opening 56. The pin 52 is in moving engagement with the handle 40. The pin 52 is inserted into or withdrawn from an opening 57 (as shown in FIG. 1) in the counterpart coupling by movement of the handle 40. The pin 52 prevents accidental disconnection of the couplings while the valve 30 is in an open position. Another embodiment of the feature is shown in FIG. 7. In this embodiment, the pin 52 and spring 54 as shown in the embodiment of FIG. 4 can be replaced with a head 58 integrally connected to a flexible plastic cable 59. The head 58 and cable 59 are positioned in an opening 56. As shown in FIG. 7, the head 58 is in moving engagement with the handle 40 through attachment of the cable 59 with the handle 40. The head 58 is inserted into or withdrawn from an opening 57 (as shown in FIG. 1) in the counterpart coupling by movement of the handle 40. The head 58 prevents accidental disconnection of the couplings while the valve 30 is in an open position. The present invention can also include the gear driven safety pin shown in assignee's U.S. Pat. No. 5,099,883, which is incorporated herein by reference.

Figure 5:
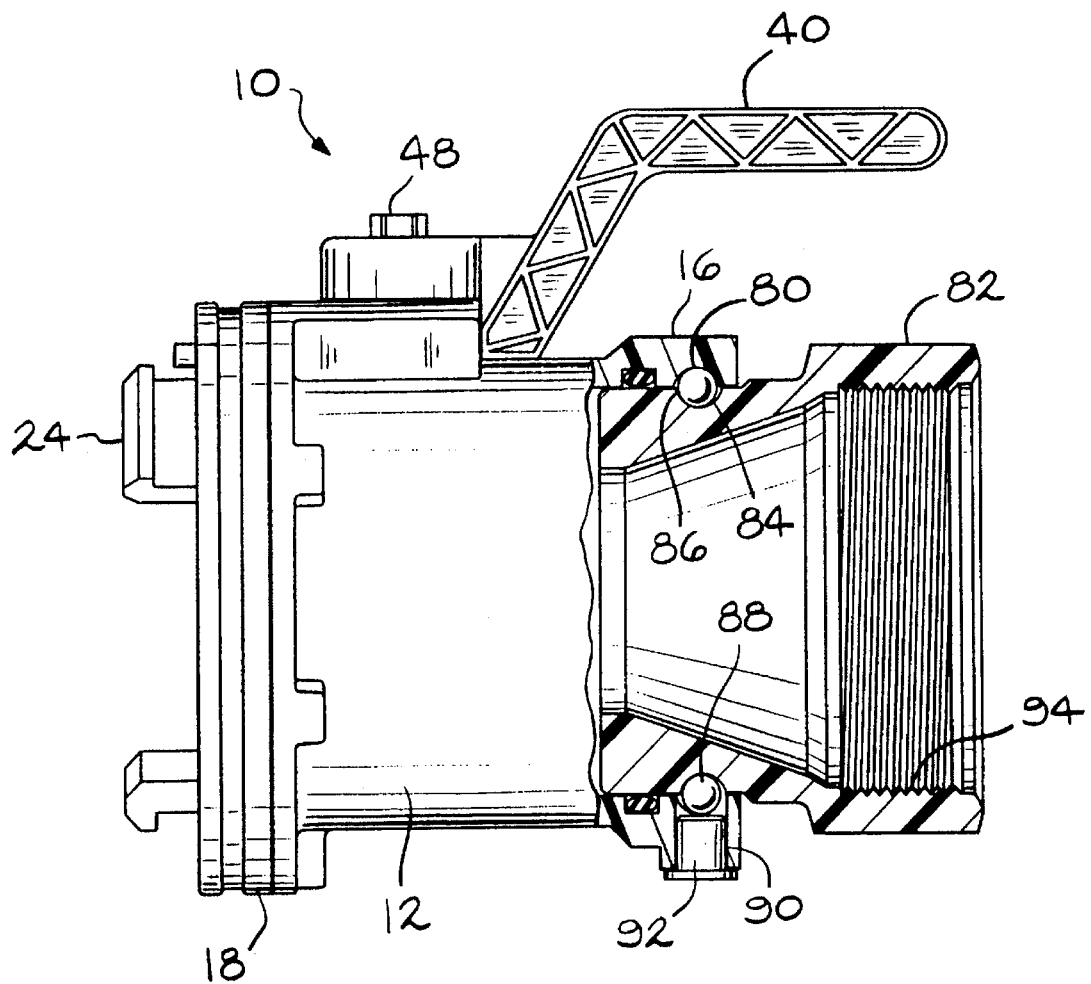
FIG. 5 is a side elevational view of the second embodiment of the present invention with the second end of the housing and the fluid conduit adapter partially cut away to show the interior of such structures.

The second embodiment of the present invention is shown in FIGS. 4 and 5. The second embodiment has the same features of the first embodiment with the exception of how the second end 16 is adapted to receive the fluid conduit. In this embodiment, the second end 16 includes a first annular groove 80. The second end 16 receives a fluid conduit adapter member 82 having a second annular groove 84. When the adapter member is positioned within the second end 16, the first groove 80 and the second groove 84 are aligned. The grooves form an annular cavity 86. As shown in FIG. 4, a connection member 88 is inserted in an opening 90 in the housing 12. The connection member 88 can be metal or plastic wire. The connection member 88 can also be metal or plastic ball bearings. The connection member 88 has the flexibility to travel circumferentially through the cavity 86 as shown in FIG. 5. A plug 92 is inserted in the opening 90 after the connection member 88 has been inserted. The connection member 88 maintains the adapter member 82 with respect to the second end 16. The adapter member includes an integral threaded portion 94 for mating with a threaded portion on a fluid conduit.

The adapter member 82 allows the coupling 10 to be swiveled or rotated because the connection member 88 acts as a bearing. The adapter member 82 also allows the coupling to be used with a variety of fluid conduits because the coupling can be connected to adapter members having various dimensions to accommodate the conduits. The adapter member 82 can be constructed of a polymer material selected from a group including acrylonitrile-butadiene-styrene, phenolic, polycarbonate, polyethylene, polypropylene, and polystyrene.

As shown in FIG. 4, the handle 40 has a projection 96 on the shaft 44 adjacent to the connection plate 42. The housing 12 includes a first recess 98 and a second recess 100. The recesses receive the projection 96. When the handle 40 is rotated from a first position to a second position, the projection 96 is moved from the first recess 98 to the second recess 100 and vice versa to maintain the handle 40 in a proper position. This prevents the handle 40, and therefore the valve 30, from inadvertent movement.

Figure 6:
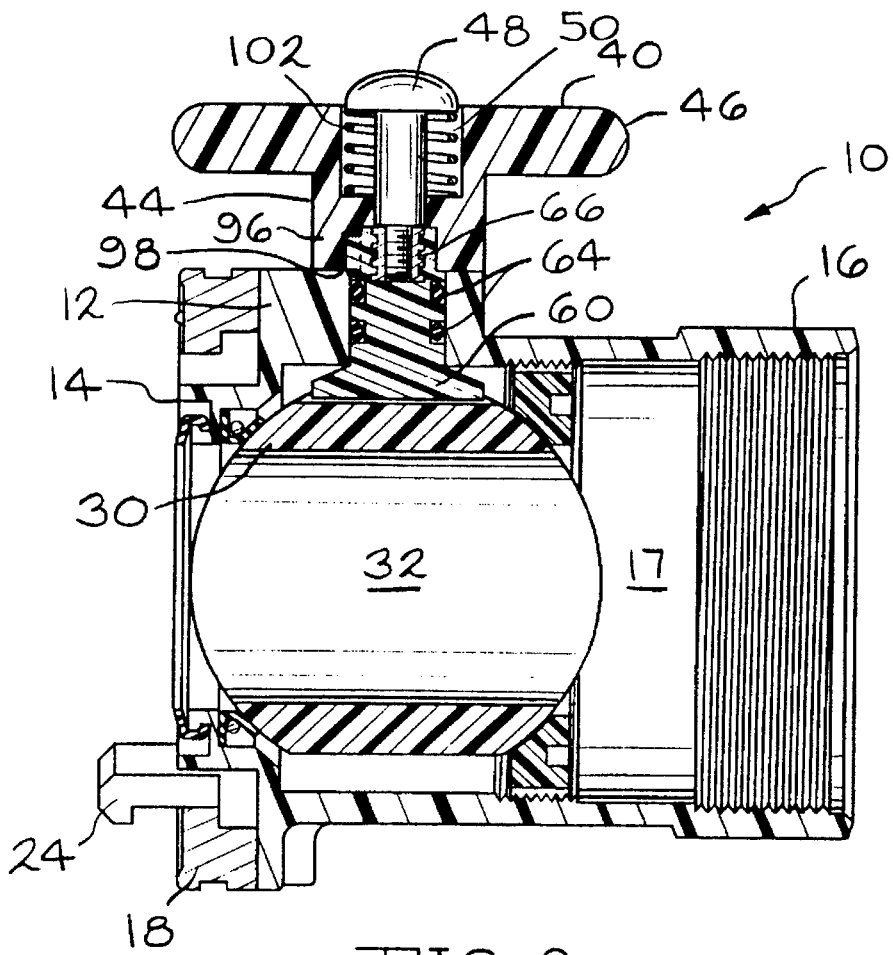
FIG. 6 is a side elevational view of a third embodiment of the present invention shown in cross-section; and, FIG. 7 is a top view of the first embodiment of the present invention with the handle and housing partially cut away to show a safety interlock pin assembly.

A third embodiment of the invention is shown in FIG. 6. This embodiment includes the features of the first embodiment with the exception of the handle 40. In this embodiment, the handle 40 has a T-shaped configuration. The handle includes a shaft 44 and a hand piece 46. The handle 40 is connected to the actuator 60 by a shoulder screw 48 that extends through an opening 50 in the hand piece 46 and the shank 44 to the actuator. The actuator 60 is in communication with the valve 30.

The handle 40 is constructed of a polymer material selected from a group including acrylonitrile-butadiene-styrene, phenolic, polycarbonate, polyethylene, polypropylene, and polystyrene. The actuator 60 is composed of a polymer material selected from a group including acrylonitrile-butadiene-styrene, phenolic, polycarbonate, polyethylene, polypropylene, and polystyrene.

As shown in FIG. 6, the handle includes at least one projection 96 at the base of the shank 44. The housing 12 includes at least one recess 98 for receiving the projection 96. The handle 40 can include one or more projections 96 having a variety of shapes, locations, or configurations. The housing 12 can include one or more recesses 98 that correspond to the shapes, locations, or configurations of the projections, This allows the handle 40 to be keyed to the housing 12. This ensures that the handle is properly positioned for efficiency and safety.

Still referring to FIG. 6, the handle 40 includes a coiled spring 102 positioned around the screw 48 and the shank 44. The spring 102 provides resistance on the outward travel of the handle with respect to the housing 12. The handle 40 must be lifted so that the projections 96 are clear of the recesses 98 to turn or actuate the valve 30.

Many changes can be made to the present invention without department from the scope of the appended claims.

We claim:

1. An improved non-metallic identical half coupling having a housing enclosing a valve that can be rotated between open and closed positions comprising:
   (a) an annular housing comprised of a polymer material having a first end and a second end, said first end including an annular face plate comprised of a polymer material, said face plate having arcuate connector fingers axially extending therefrom for mating with a second identical half coupling, said face plate including openings for receiving metallic screws, said housing including metallic inserts for receiving metallic screws, screws extending through said openings into said inserts for maintaining said face plate on said first end, said second end of said housing being adapted to receive a fluid conduit, a fluid passageway defined through said housing;
   (b) a valve having a spherical configuration positioned adjacent said first end in said housing, said valve comprised of a polymer material, said valve defining a bore having an axis extending through said bore; and
   (c) a valve actuation means in communication with said valve, said valve actuation means comprised of a polymer material, said valve actuation means rotating said valve about a valve axis transverse to said bore axis between an open position wherein said valve bore is in communication with said first end and said fluid passageway of said housing and a closed position wherein said valve closes said first end from said fluid passageway.

2. The improved coupling of claim 1, wherein said face plate is comprised of a polymer material selected from the group consisting of acrylonitrile-butadiene-styrene, phenolic, polycarbonate, polyethylene, polypropylene, and polystyrene.

3. An improved non-metallic identical half coupling having a housing enclosing a valve that can be rotated between open and closed positions comprising:
   (a) an annular housing comprised of a polymer material having a first end and a second end, said first end being adapted to receive a second identical half coupling, said second end being adapted to receive a fluid conduit, a fluid passageway defined through said housing;
   (b) a valve having a spherical configuration positioned adjacent said first end in said housing, said valve comprised of a polymer material, said valve defining a bore having an axis extending through said bore; and
   (c) a valve actuation member in communication with said valve, said member comprised of a polymer material, said member including a handle having a housing connection plate, a shank and a hand piece, said handle including at least one projection on said shaft adjacent said connection plate, said housing including at least one recess for receiving said projection, said projection being inserted in said recess, said member being connected by a screw to an actuator comprised of a polymer material, said actuator being in communication with said valve, whereby when said valve actuation member is moved from a first position to a second position, said valve is rotated about a valve axis transverse to said bore axis between an open position wherein said valve bore is in communication with said first end and said fluid passageway of said housing and a closed position wherein said valve closes said first end from said fluid passageway.

4. The improved coupling of claim 3, wherein said handle is comprised of a polymer material selected from the group consisting of acrylonitrile-butadiene-styrene, phenolic, polycarbonate, polyethylene, polypropylene, and polystyrene.

5. The improved coupling of claim 3, wherein said actuator is comprised of a polymer material selected from the group consisting of acrylonitrile-butadiene-styrene, phenolic, polycarbonate, polyethylene, polypropylene, and polystyrene.

6. The improved coupling of claim 3, wherein said first end of said housing includes an opening for receiving a safety interlock member, said member being in moving engagement with said handle, said member being inserted into or withdrawn through said handle, said member being inserted into or withdrawn through said opening in said first end in response to movement of said handle.

7. An improved non-metallic identical half coupling having a housing enclosing a valve that can be rotated between open and closed positions comprising:
   (a) an annular housing comprised of a polymer material having a first end and a second end, said first end being adapted to receive a second identical half coupling, said second end being adapted to receive a fluid conduit, a fluid passageway defined through said housing;
   (b) a valve having a spherical configuration positioned adjacent said first end in said housing, said valve comprised of a polymer material, said valve defining a bore having an axis extending through said bore; and
   (c) a valve activation member in communication with said valve, said member comprised of a polymer material, said member including a T-shaped handle including a shank and a hand piece, said member being connected to an actuator comprised of a polymer material, said actuator being in communication with said valve, whereby when said valve activation member is moved from a first position to a second position, said valve is rotated about a valve axis transverse to said bore axis between an open position wherein said valve bore is in communication with said first end and said fluid passageway of said housing and a closed position wherein said valve closes said first end from said fluid passageway.

8. The improved coupling of claim 7, wherein said handle is comprised of a polymer material selected from the group consisting of acrylonitrile-butadiene-styrene, phenolic, polycarbonate, polyethylene, polypropylene, and polystyrene.

9. The improved coupling of claim 7, wherein said actuator is comprised of a polymer material selected from the group consisting of acrylonitrile-butadiene-styrene, phenolic, polycarbonate, polyethylene, polypropylene, and polystyrene.

10. The improved coupling of claim 7, wherein said handle includes at least one projection on said shank, said housing includes at least one recess for receiving said projection, said handle further including a coiled spring positioned adjacent said screw in said handle, said projection being inserted in said recess, said spring providing resistance on the outward movement of said handle with respect to said housing.

11. An improved non-metallic identical half coupling having a housing enclosing a valve that can be rotated between open and closed positions comprising:

(a) an annular housing comprised of a polymer material having a first end and a second end, said first end being adapted to receive a second identical half coupling, said second end being adapted to receive a fluid conduit, a fluid passageway defined through said housing;

(b) a valve having a spherical configuration positioned adjacent said first end in said housing, said valve comprised of a polymer material, said valve defining a bore having an axis extending through said bore;

(c) at least one energized spring positioned adjacent said first end of said housing and at least one O-ring seal and at least one wave spring positioned adjacent said second end of said housing to maintain said valve within said housing; and (d) a valve actuation means in communication with said valve, said valve actuation means comprised of a polymer material, said valve actuation means rotating said valve about a valve axis transverse to said bore axis between an open position wherein said valve bore is in communication with said first end and said fluid passageway of said housing and a closed position wherein said valve closes said first end from said fluid passageway.

12. The improved coupling of claim 11, wherein said polymer material of said housing is selected from the group consisting of acrylonitrile-butadiene-styrene, phenolic, polycarbonate, polyethylene, polypropylene, and polystyrene.

13. The improved coupling of claim 11, wherein said second end is adapted to receive said fluid conduit by including an integral threaded portion, said threaded portion receiving a mating threaded portion of said fluid conduit.

14. The improved coupling of claim 11, wherein said second end is adapted to receive said fluid conduit by including a first annular groove, said second end receiving a fluid conduit adapter member consisting of a polymer material having a second annular groove, said grooves being aligned, a connection wire being positioned in said grooves, said wire maintaining said adapter member with respect to said second end, said adapter member having an integral threaded portion for mating with a threaded portion on said fluid conduit.

15. The improved coupling of claim 14, wherein said fluid conduit adapter member is comprised of a polymer material selected from the group consisting of acrylonitrile-butadiene-styrene, phenolic, polycarbonate, polyethylene, polypropylene, and polystyrene.

16. The improved coupling of claim 11, wherein said valve is comprised of a polymer material selected from the group consisting of acrylonitrile-butadiene-styrene, phenolic, polycarbonate, polyethylene, polypropylene, and polystyrene.

* * * * *